Patented Jan. 25, 1938

2,106,552

UNITED STATES PATENT OFFICE 2,106,552

THIOCARBANILIDE DERIVATIVES

Russell L. Jenkins, Kirkwood, Mo., and Max M. Levine, Rochester, N. Y., assignors, by mesne assignments, to Monsanto Chemical Company, a corporation of Delaware No Drawing. Application March 30, 1936, Serial No. 71,684

3 Claims. (Cl. 260—125)

The present invention relates to substituted thiocarbanilides and it has particular relation to thiacarbanilides containing one or more benzene groups substituted in each of the aromatic nuclei joined to the nitrogen atoms.

The main objects of the invention are to provide:

A new class of compounds, some of which may be prepared from materials which are a byproduct in the manufacture of other important compounds and for which there has heretofore been but slight demand.

A new class of compounds which may be prepared by simple and inexpensive methods.

A new class of compounds adaptable for various technical applications including use as dye intermediates, as materials for the manufacture of synthetic resins, as accelerators of vulcanization of rubber compounds, as inhibitors of corrosion, in the pickling of metals, as modifiers of lubricants, as antioxidants in various organic materials, etc.

These and other objects will be apparent from perusal of the following specification and the appended claims.

It has been observed that diphenyl and derivatives thereof, such as benzene- and chlorine-substituted diphenyls may be treated with nitric acid to form nitro compounds and that these nitro compounds may be reduced by the methods employed to reduce nitrobenzene to form nuclear substituted primary aromatic amines.

The present invention involves the discovery that these amino compounds in spite of the presence of various other groups as substituents in the nuclei, easily undergo reaction with carbon disulfide to form derivatives of thiocarbanilide which although similar in many respects to the latter material have important characteristics distinguishing them therefrom.

As examples of derivatives of diphenyl which may be reacted in this manner with carbon bisulfide, mention is made of the following material:

2-aminodiphenyl
2,4-diphenyl-aniline
4-chloro-2'-aminodiphenyl
2-chloro-4'-aminodiphenyl
4-4'-dichloro-2-aminodiphenyl
4-chloro-4'-aminodiphenyl
2-chloro-2'-aminodiphenyl Obviously chlorine in these compounds may be replaced by bromine and one or all of the benzene nuclei may be partially or completely hydrogenated.

The above compounds when reacted with carbon bisulfide result in thiocarbanilide derivatives of the following formulae:

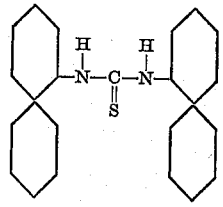

2,2'-diphenyl-thiocarbanilide

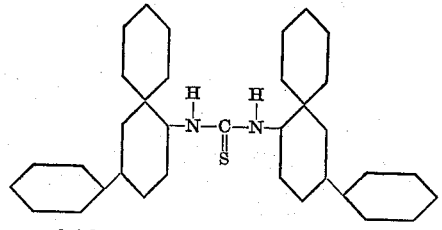

2,4,2',4'-tetra-phenyl-thiocarbanilide

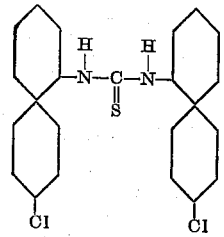

2,2'-di-(parachlorophenyl)-thiocarbanilide

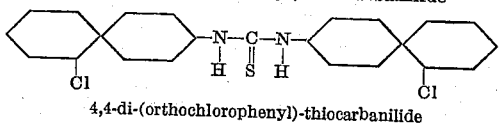

4,4-di-(orthochlorophenyl)-thiocarbanilide

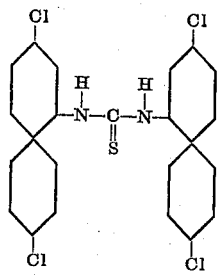

3,3'-dichloro-6,6'-di(parachlorophenyl)-thiocarbanilide

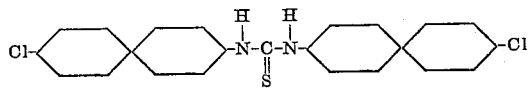

4,4'-di-(parachlorophenyl)-thiocarbanilide

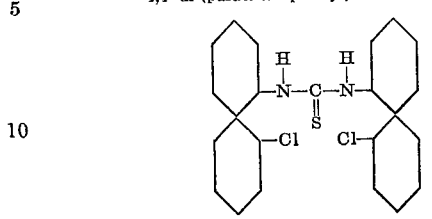

,2'-di-(orthochlorophenyl)-thiocarbanilide.

Where partially or completely hydrogenated derivatives of aniline are employed, corresponding hydrogenated derivatives of thiocarbanilide will result.

The following constitute examples of procedures employed in the preparation of these compounds. The apparatus employed comprised a suitable container which was provided with a water cooled reflux condenser and was heated by means of a water bath. The same or similar apparatus was employed in each example.

*Example 1.*—100 parts by weight of 2-aminodiphenyl, 55 parts of carbon disulfide and 10 parts of caustic potash were mixed together with 75 parts of alcohol and then heated for approximately 10 hours. The yellow reaction product was then stirred in the reaction flask with several hundred parts of water. The crystals were filtered off and washed several times with water, thereby entirely removing the yellow color. They were then stirred with 66% alcohol, filtered, washed and dried. The dried product had a melting point of 154.6°–155.0° C. the yield being approximately 75% of the theoretical. Upon recrystallization from benzol, long white rectangular crystals were obtained having a melting point of 154.6°–155.0° C.

*Example 2.*—12 grams of 2,4-diphenyl-aniline, 5 parts of carbon disulfide and 1.5 parts caustic potash were mixed together with 9 parts of ethyl alcohol, then heated for a period of 7½ hours. The reaction product was stirred with water several times and then heated with boiling benzol in which it is only slightly soluble. The benzol was cooled, the crystals which separate, were filtered off, washed with benzol and air dried.

The yield was approximately 71% and the product had a melting point of 193.9° to 194.3° C. The product was recrystallized from toluol and the melting point raised to 194.2°–194.4° C.

*Example 3.*—12 grams of 4-coloro-2'-aminodiphenyl, 5 parts by weight of carbon disulfide and 1.5 parts of caustic potash were heated together with 9 parts of ethyl alcohol for approximately 7.5 hours.

The reaction product was then worked up by first removing the unreacted carbon disulfide by evaporation, then washing the product several times with water. The melting point of the crude product obtained was in the neighborhood of 175.6–176.0° C. Upon recrystallizing from toluol the melting point of the crystals was raised to 180.0 to 180.2° C. The pure product was not very soluble in hot benzol.

*Example 4.*—12 parts by weight of 2-chloro-4'-aminodiphenyl, 6 parts of carbon disulfide and 1.5 parts of caustic potash were heated together with 9 grams of ethyl alcohol for approximately 7¼ hours. The reaction product was freed from carbon disulfide by evaporation, then stirred in water and filtered. The crystals were dissolved in hot benzol, in which the compound was somewhat more soluble than that formed in Example 3 above, and thus recrystallized. It may also be recrystallized from toluol, and white crystals melting between 171.5° C. and 171.8° C. obtained.

*Example 5.*—5.8 parts by weight of 4,4'-dichloro-2-aminodiphenyl, 4.0 grams carbon disulfide and 1.0 part of caustic potash were heated together with 5.8 parts ethyl alcohol for a period of approximately 17 hours. The reaction product was freed of carbon disulfide by evaporation of the latter; stirred in water and filtered. The crystals were boiled with alcohol, cooled, filtered and the crystals washed with cold alcohol. The crystals were then dissolved in boiling toluene, cooled, whereupon the product crystallized out as a white cotton-like mass. It was filtered off, washed with benzol and dried. The product melted at 181.3° C.

The products as thus obtained are similar to thiocarbanilide in characteristics. The reactions employed in their manufacture are simple and economical to conduct.

Although only the preferred forms of the invention have been shown and described, it is to be understood that these are merely exemplary and that numerous modifications may be made therein without departure from the spirit of the invention or the scope of the appended claims.

What we claim is:

1. A chemical compound, 2,2',4,4'-tetraphenyl-thiocarbanilide, being the reaction product of carbon bisulfide and 2,4-diphenylaniline, said product being a crystalline substance having a melting point of approximately 194° C.

2. A chemical compound, 3,3'-dichloro-6,6'-di-(4-chlorophenyl)-thiocarbanilide, being the reaction product of 4,4'-dichloro-2-aminodiphenyl and carbon bisulfide, said product being a crystalline substance having a melting point of approximately 181° C.

3. A chemical compound consisting of the reaction product of carbon disulfide with an amine selected from the group consisting of 2,4-diphenylaniline and 4,4'-dichloro-2-aminodiphenyl.

RUSSELL L. JENKINS.
MAX M. LEVINE.

CERTIFICATE OF CORRECTION.

Patent No. 2,106,552.                                January 25, 1938.

RUSSELL L. JENKINS, ET AL.

It is hereby certified that error appears in the printed specification of the above numbered patent requiring correction as follows: Page 1, first column, line 3, for "thiacarbanilides" read thiocarbanilides; line 43-44, for "material" read materials; page 2, first column, line 14, for ",2'-di-", read 2,2'-di-; line 56, for "coloro" read chloro; and that the said Letters Patent should be read with these corrections therein that the same may conform to the record of the case in the Patent Office.

Signed and sealed this 1st day of March, A. D. 1938.

Henry Van Arsdale,
(Seal)                                Acting Commissioner of Patents.